(12) United States Patent
Gupta

(10) Patent No.: US 11,128,468 B2
(45) Date of Patent: Sep. 21, 2021

(54) DECENTRALIZED DOCUMENT AND ENTITY VERIFICATION ENGINE

(71) Applicant: Vishal Gupta, New Delhi (IN)

(72) Inventor: Vishal Gupta, New Delhi (IN)

(*) Notice: Subject to any disclaimer, the term of this patent is extended or adjusted under 35 U.S.C. 154(b) by 0 days.

(21) Appl. No.: 17/320,050

(22) Filed: May 13, 2021

(65) Prior Publication Data

US 2021/0266169 A1 Aug. 26, 2021

Related U.S. Application Data

(63) Continuation of application No. 17/048,872, filed as application No. PCT/IB2019/053263 on Apr. 19, 2019.

(30) Foreign Application Priority Data

Apr. 20, 2018 (IN) .............................. 201811015112
Sep. 29, 2018 (IN) .............................. 201811036931
(Continued)

(51) Int. Cl.
*H04L 9/32* (2006.01)
*G06F 21/12* (2013.01)
(Continued)

(52) U.S. Cl.
CPC .......... *H04L 9/3228* (2013.01); *G06F 21/128* (2013.01); *H04L 9/0825* (2013.01);
(Continued)

(58) Field of Classification Search
CPC ... H04L 9/3228; H04L 9/3213; H04L 9/3247; H04L 9/0827; H04L 9/3231;
(Continued)

(56) References Cited

U.S. PATENT DOCUMENTS 8,701,174 B1* 4/2014 Dotan .................... G06F 21/34
726/9
10,298,396 B1* 5/2019 Kurani .................. H04L 9/3231
(Continued)

FOREIGN PATENT DOCUMENTS

GB 201711788 6/2017
WO 2016189488 A2 12/2016

OTHER PUBLICATIONS

"AADHAAR E-KYC API Specifiction-Version 2.5" (Unique Identification Authority of India) Mar. 31, 2018.
(Continued)

*Primary Examiner* — Darren B Schwartz
(74) *Attorney, Agent, or Firm* — Maschoff Brennan

(57) ABSTRACT

A system and method enabling an entity to prove its identity and provide authentic documents/data/information therein at any time required based upon data retrieved from an independent cryptographically verifiable source (ICVS) through a secured channel is disclosed. The system enables a virtual and secure browser on a user computing device allowing a user to login and retrieve authentic information pertaining to the user from the ICVS in a verifiable and untamperable manner. The retrieved information is bounded with origination information of the ICVS and the bounded information is provided to relying entities as authentic information for verification. Also, cryptographic value of the authentic information can be stored in an immutable storage such as blockchain, so that the cryptographic value is used by the relying-party to validate integrity of the authentic information.

17 Claims, 7 Drawing Sheets

(30) Foreign Application Priority Data

Dec. 14, 2018 (IN) .............................. 201811047339
Mar. 1, 2019 (IN) .............................. 201911008056

(51) Int. Cl.
  *H04L 9/08* (2006.01)
  *H04L 29/06* (2006.01)
  *H04L 29/08* (2006.01)

(52) U.S. Cl.
  CPC .......... *H04L 9/0827* (2013.01); *H04L 9/0894* (2013.01); *H04L 9/3213* (2013.01); *H04L 9/3231* (2013.01); *H04L 9/3234* (2013.01); *H04L 9/3247* (2013.01); *H04L 9/3265* (2013.01); *H04L 63/18* (2013.01); *H04L 67/025* (2013.01); *H04L 2209/127* (2013.01); *H04L 2209/38* (2013.01); *H04L 2209/60* (2013.01)

(58) Field of Classification Search
  CPC ..... H04L 9/3234; H04L 9/3265; H04L 63/18; H04L 9/0825; H04L 9/0894; H04L 67/025; H04L 2209/127; H04L 2209/38; H04L 2209/60; G06F 21/128
  See application file for complete search history.

(56) References Cited

U.S. PATENT DOCUMENTS

| | | | | |
|---|---|---|---|---|
| 10,581,847 B1* | 3/2020 | Sun | ........................ | H04W 12/40 |
| 10,601,590 B1* | 3/2020 | Chhabra | ................. | G06F 21/53 |
| 10,938,560 B2* | 3/2021 | Thom | .................. | H04L 9/0822 |
| 2007/0192601 A1 | 8/2007 | Spain et al. | | |
| 2011/0113477 A1* | 5/2011 | Miyabayashi | ...... | H04L 63/0492 726/7 |
| 2013/0281058 A1* | 10/2013 | Obaidi | .................... | H04L 67/22 455/411 |
| 2014/0101734 A1* | 4/2014 | Ronda | ................. | G06F 21/6227 726/5 |
| 2014/0289833 A1* | 9/2014 | Briceno | .................. | H04L 9/006 726/7 |
| 2014/0317686 A1* | 10/2014 | Vetillard | ............... | G06F 21/606 726/2 |
| 2015/0058629 A1* | 2/2015 | Yarvis | ................. | H04L 63/0442 713/171 |
| 2015/0071437 A1* | 3/2015 | Chastain | ............... | H04L 9/3234 380/249 |
| 2017/0109751 A1* | 4/2017 | Dunkelberger | ....... | H04L 9/3226 |
| 2017/0180356 A1* | 6/2017 | Sherman | ............... | H04L 9/3218 |
| 2017/0310647 A1* | 10/2017 | Hu | ....................... | H04L 63/0853 |
| 2018/0096163 A1* | 4/2018 | Jacques de Kadt | ... | G06Q 40/02 |
| 2018/0152454 A1* | 5/2018 | Kwon | .................... | H04L 63/10 |
| 2018/0270065 A1* | 9/2018 | Brown | .................. | H04L 9/0643 |
| 2019/0116174 A1* | 4/2019 | Gray | ...................... | H04L 63/0442 |
| 2019/0303600 A1* | 10/2019 | Hamel | ................ | H04L 63/0823 |
| 2020/0382306 A1* | 12/2020 | Wang | .................... | G06F 21/602 |

OTHER PUBLICATIONS

ISR and Written Opinion in PCT Application No. PCT/IB2019/053263 dated Aug. 14, 2019.

* cited by examiner

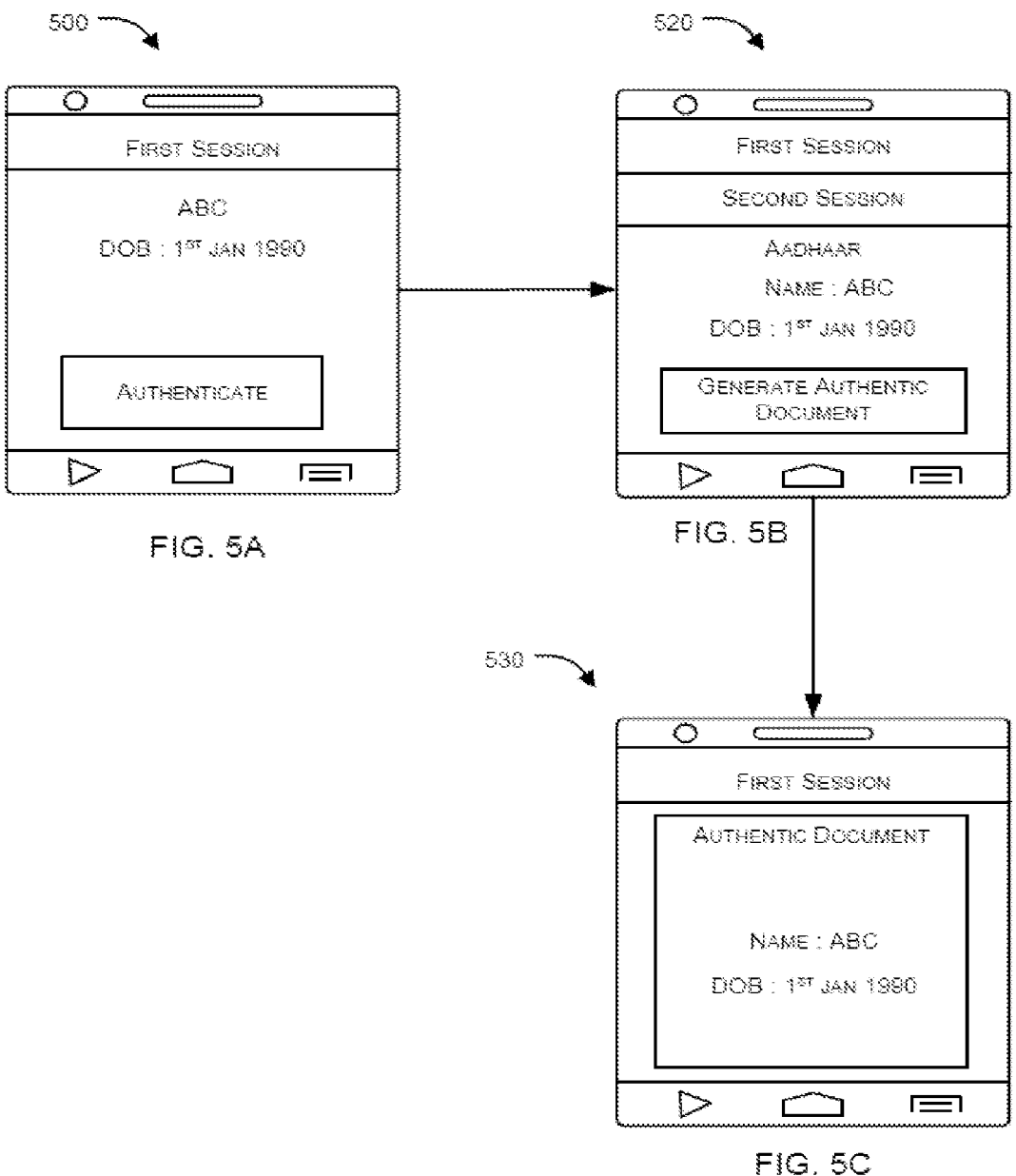

DECENTRALIZED DOCUMENT AND ENTITY VERIFICATION ENGINE

TECHNICAL FIELD

The present disclosure relates to the field of authentication system and methods. In particular it pertains to provision of authentic entity information based on original authentication data retrieved from an independent cryptographically verifiable source (ICVS) so as to authenticate an entity and/or data provided thereby.

BACKGROUND

Background description includes information that may be useful in understanding the present invention. It is not an admission that any of the information provided herein is prior art or relevant to the presently claimed invention, or that any publication specifically or implicitly referenced is prior art.

In current era of digitization, many documents are being stored in electronic or digital formats in authorized repositories. Certain authorized repositories store unique information including biometric credentials of various users and are supposed to serve to verify/authenticate identity of the users wherever necessary. Such repositories can include storage of driving licenses, birth and death certificates, passports, etc, which contain authenticated information of the users. Many of such documents are required to be offered for different purposes. In an instance, verification/authentication of identity using these repositories can allow access to some governmental benefits and services. In another instance, a potential employer or bank may require to have authenticated copy of identification documents of a candidate. While online availability of documents as elaborated above is increasing, so is the associated problem of identity fraud. It is very easy to manipulate or Photoshop digital as well as hard/print copy of such documents using software freely available. Thus, instances of identity frauds are ever increasing.

Various approaches exist to mitigate the existing problems. A technique disclosed by PCT Application No. PCT/IB2016/053086 (referred to as '086 patent) provides an approach for detection on tampering of a document. According to '086 patent an original document is stored along with associated at least one digital certificate from at least one issuing authority at a server. A unique identifier is associated with the original document and is also stored corresponding to the original document at the server. Another instance of the original document is created, wherein the instance of the original document includes the unique identifier such that a user of the instance of the original document verifies source and authenticity of the instance of the original document by transmitting the unique identifier to the server in order to retrieve the associated at least one digital certificate based on the unique identifier, and evaluates the retrieved associated digital certificate.

However, the approach disclosed by '086 patent relates to retrieval of a stored original document and does not relate to retrieval of the original information from a verified source in real-time. Thus, approach provided by '086 patent is less secure and does not deal with identity verification or combining multiple original documents to create a stronger identity. Also, the identity data is not cryptographically secured and is thus, easily susceptible to hacking. Further, other existing approaches by themselves add additional layers where information may be manipulated leading to identity fraud. For instance, providing one's fingerprint at a biometric device opens one to the possibility that the provided fingerprint itself may be used to create a fraudulent identity.

In addition to above-mentioned problems, a global digital identity system does not exist, due to which all entities such as banks still require physical Know Your Customer (KYC) for compliance with Anti-Money Laundering (AML) compliance. Further, many government or enterprise services and on-boarding workflows require notarization and apostle or a physical presence of a user due to which governments are required to have physical application processing centers with limited regional coverage for visa, licenses and permits, etc. Furthermore, exposure to counterfeiting and forgery leads to an undue time, cost, liability and friction to global commerce. Another issue with typical credential verification approach is the "phone-home-problem", where the credentials are required to be verified with the issuer, thereby incurring mass-surveillance possibility of the credential users.

Therefore, there is a need in the art for a method and a system whereby a user can provide authentic user information based upon original data from verified sources at any time. There is further need in the art for a system and method that can maximize authenticity of information of the user, cryptographically secure the user information, and provide fraud proof approach of identity sharing while saving privacy of sensitive information pertaining to the user.

OBJECTS OF THE PRESENT DISCLOSURE

It is a general object of the present disclosure to provide a system and method for generating verified documents for an entity or a user.

It is another object of the present disclosure to provide a system and method for generating verified documents that cannot be tampered.

It is yet another object of the present disclosure to provide a system and method for generating verified documents that can be used by relying entities or authorities as a proof of authentic information of a user, It is still another object of the present disclosure to provide a system and method for generating verified documents that can be associated with a unique identifier/code so that the user or the relying entity can use the unique identifier/code to fetch verified information of the user for various purposes.

It is still another object of the present disclosure to provide a system and method for generating verified documents that allows access of private data of the user without loss of trust.

It is still another object of the present disclosure to provide a system and method for generating verified documents that provides anti-impersonation checks against global third parties.

It is still another object of the present disclosure to provide a system and method for generating verified documents that solves typical "phone-home-problem" by decentralizing the verification proof using blockchain.

It is still another object of the present disclosure to provide a system and method for generating verified documents that enables relying parties to access private information stored with third parties, while maximizing its authenticity, privacy and decentralized verification.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein:

FIGS. 5A-C illustrate another example of generation of an authentic document in accordance with an embodiment of the present invention.

SUMMARY

Figure 1:
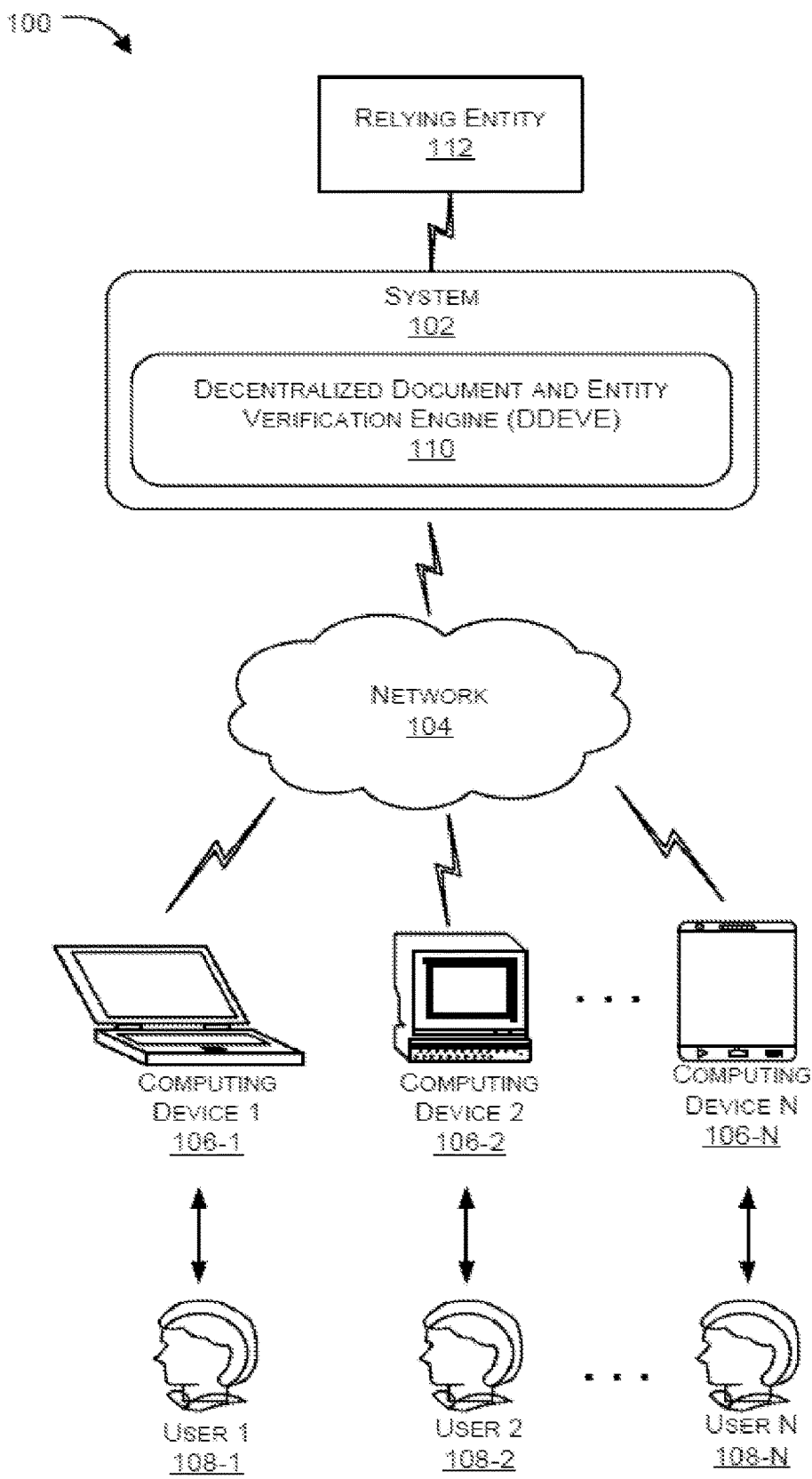
FIG. 1 illustrates an exemplary network architecture showing plurality of users and how the plurality of users interacts with system in accordance with an embodiment of the present disclosure.

This summary is provided to introduce simplified concepts of a system and method that facilitates authentication and verification of documents, which are further described below in the Detailed Description. This summary is not intended to identify key or essential features of the claimed subject matter, nor is it intended for use in determining/limiting the scope of the claimed subject matter.

The present disclosure relates to the field of authentication system and methods. In particular it pertains to provision of authentic entity information based on original authentication data retrieved from an independent cryptographically verifiable source (ICVS) so as to authenticate an entity and/or data provided thereby.

An aspect of the present disclosure relates to a system comprising a processor and a memory comprising one or more routines, which when executed by the processor, cause the processor to configure, for a user working on a verification initiator unit (VIU) provided by a relying entity, a first session having a hyperlink that enables instantiation of a second session on a virtual browser on the VIU using a web gateway, said second session being partially configured on a remote terminal so as to operatively couple the remote terminal with the first session of the user of a first computing device; configure the second session to open, in the virtual browser, an independent cryptographically verifiable source (ICVS) to enable said ICVS to authenticate the user; retrieve a first set of data packets pertaining to the user from the ICVS through a secure data channel; bind a second set of data packets that are selected from the first set of data packets with origination information of the ICVS so as to generate a third set of data packets; and transmit the third set of data packets to the relying entity of the first session.

Another aspect of the present disclosure relates to a device comprising: a processor running a trusted execution environment (TEE); and a memory comprising one or more routines, which when executed by the processor, cause the processor to: retrieve a first set of data packets pertaining to a user from an independent cryptographically verifiable source (ICVS) through a secure data channel; bind a second set of data packets that are selected from the first set of data packets with origination information of the ICVS so as to generate a third set of data packets that is processed to generate a cryptographic value pertaining to said third set of data packets; and store the cryptographic value in an immutable storage, said cryptographic value being used by a third relying-party to validate integrity of the third set of data packets.

A yet another aspect of the present disclosure relates to a method comprising: configuring, by one or more processors, for a user working on a verification initiator unit (VIU) provided by a relying entity, a first session having a hyperlink that enables instantiation of a second session on a virtual browser on the VIU using a web gateway, said second session being partially configured on a remote terminal so as to operatively couple the remote terminal with the first session of the user of the first computing device; configuring, by the one or more processors, the second session to open, in the virtual browser, an independent cryptographically verifiable source (ICVS) to enable said ICVS to authenticate the user; retrieving, by the one or more processors, a first set of data packets pertaining to the user from the ICVS through a secure data channel; binding, by the one or more processors, a second set of data packets that are selected from the first set of data packets with origination information of the ICVS so as to generate a third set of data packets; and transmitting, by the one or more processors, the third set of data packets to the relying entity of the first session.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing. The present disclosure relates to the field of authentication system and methods. In particular it pertains to provision of authentic entity information based on original authentication data retrieved from an independent cryptographically verifiable source (ICVS) so as to authenticate an entity and/or data provided thereby.

The present disclosure relates to the field of systems and methods for an entity/user (the two terms used interchangeably herein) authentication. In particular it pertains to authentication of a user based upon original authentication data stored in one/more remote repository and/or receipt of authentic documents/data/information pertaining to the individual while maximizing privacy such that sensitive data of the individual is not compromised.

An aspect of the present disclosure relates to a system comprising: a processor; and a memory comprising one or more routines, which when executed by the processor, cause the processor to: configure, for a user working on a verification initiator unit (VIU) provided by a relying entity, a first session having a hyperlink that enables instantiation of a second session on a virtual browser on the VIU using a web gateway, said second session being partially configured on a remote terminal so as to operatively couple the remote terminal with the first session of the user of a first computing device; configure the second session to open, in the virtual browser, an independent cryptographically verifiable source (ICVS) to enable said ICVS to authenticate the user; retrieve a first set of data packets pertaining to the user from the ICVS through a secure data channel; bind a second set of data packets that are selected from the first set of data packets with origination information of the ICVS so as to generate a third set of data packets; and provide access of the third set of data packets to the relying entity of the first session.

In an embodiment, the remote terminal runs on a trusted execution environment (TEE), wherein one or more attributes of the TEE are associated with the third set of data packets.

In an embodiment, the virtual browser comprises a plug-in that receives at least session parameter that is associated with the first session, wherein said parameter relates to any or a combination of session id, user device, user, ICVS, timestamp, location, and IP address.

In an embodiment, the virtual browser is a secure browser that does not allow tampering of the first set of data packets beyond what is allowed by the ICVS.

In an embodiment, the first set of data packets are processed and utilized by the first session so as to match the first set of data packets containing user information with user information available in the first session.

In an embodiment, the third set of data packets are shared with one or more second set of relying parties in the form of any or a combination of verifiable claims or credentials, a Portable Document File (PDF) file, a decision, a JavaScript Object Notation (JSON), an Extensible Markup Language (XML), an electronic record, and a key.

Another aspect of the present disclosure relates to a device comprising: a processor running a trusted execution environment (TEE); and a memory comprising one or more routines, which when executed by the processor, cause the processor to: retrieve a first set of data packets pertaining to a user from an independent cryptographically verifiable source (ICVS) through a secure data channel; bind a second set of data packets that are selected from the first set of data packets with origination information of the ICVS so as to generate a third set of data packets that is processed to generate a cryptographic value pertaining to said third set of data packets; and store the cryptographic value in an immutable storage, said cryptographic value being used by a third relying-party to validate integrity of the third set of data packets.

In an embodiment, the ICVS is any or a combination of a secure website, a Near-Field-Communication (NFC) card, a regulatory entity issued document, and a source having a certificate issued by a certified authority.

In an embodiment, when the ICVS is the NFC card, the processor: retrieves, on the device, from receiver of the NFC card, the first set of data packets; and decrypts, on the device, the retrieved first set of data packets to enable selection of the second set of data packets and subsequent binding of the selected second set of data packets with the origination information.

In an embodiment, the processor is further configured to match, at the device, data packets from any or a combination of the first, second, or third set of data packets with identity data sourced from the device, said identity data pertaining to the user.

In an embodiment, the third set of data packets are associated with an identity of the user, said identity being selected from any or a combination of Public Key Infrastructures (PKIs) associated with the user, password of the user, Personal Identification Number (PIN) of the user, biometrics of the user, behavioral data of the user, non-fungible tokens (NFT) of the user, Fast Identity Online (FIDO) credentials of the user, device attributes of the user, and demographics of the user.

In an embodiment, the origination information of the ICVS is based on any or a combination of Secure Sockets Layer (SSL), Transport Layer Security (TLS), NFC information, IP address, domain name, who is information, certificate owner information, IP routes, forensic data pertaining to the ICVS, timestamp, sensor data pertaining to the ICVS, location information of the ICVS, status of the ICVS, and at least a portion of certificate information of the ICVS.

In an embodiment, the origination information of the ICVS comprises any or a combination of cryptographic proof of at least one of operating software and the TEE that is used to generate the third set of data packets, cryptographic proof of the user, cryptographic proof of entity running the TEE, cryptographic proof of verifier, and cryptographic proof of the third relying-party.

In an embodiment, the first set of data packets are retrieved post successful authentication of the user through any or a combination of authenticating at the ICVS, authenticating the user at the device, authenticating using a biometric means, and authenticating using a private key.

In an embodiment, the third set of data packets is associated with authentication data pertaining to the user.

In an embodiment, the TEE is configured on the device or is configured virtually from the device and is operatively coupled with the device.

In an embodiment, the immutable storage is selected from any or a combination of a blockchain, Distributed ledger technology (DLT), merkle tree, and a database.

In an embodiment, the cryptographic value is associated with a timestamp that is based on retrieval of the first set of data packets from the ICVS.

In an embodiment, the TEE comprises a secure web browser that is configured with a remote secure virtual terminal using a protocol selected from any or a combination of Remote Desktop Protocol (RDP), and Virtual Network Computing (VNC).

In an embodiment, the first set of data packets are retrieved in the form of any or a combination of a web page, text, picture, context, Hypertext Markup Language (HTML), Cascading Style Sheet (CSS), Dynamic HTML (DHTML), MIME HTML (MHTML), PDF, and downloaded file that opens in the secure web browser.

In an embodiment, the secure web browser does not allow tampering of the first set of data packets beyond what is allowed by the ICVS.

In an embodiment, the binding of the second set of data packets with the origination information of the ICVS is performed by a cryptographically signed executable code.

In an embodiment, the device digitally signs the cryptographic value based on any or a combination of hardware security module (HSM) or trusted platform module (TPM).

In an embodiment, the third relying-party, upon receipt of a document whose authenticity is to be verified, generates a second cryptographic value, and matches said second cryptographic value against at least one cryptographic value that is stored in the immutable storage in order to validate the authenticity of the document.

In an embodiment, the cryptographic value is associated with cryptographic signature of the user.

In an embodiment, the first set of data packets comprises biometric information that is selected from any or a combination of photograph of the user, fingerprint of the user, voice of the user, and iris details of the user, said biometric information being used to authenticate the user.

In an embodiment, the binding between the second set of data packets with the origination information of the ICVS is performed using any or a combination of checksum, hash function and cryptographic function.

In an embodiment, the third set of data packets comprise or are associated with results of matching biometric information with the user, or results of matching authentication information with the user, or results of matching identity information with the user.

In an embodiment, the ICVS is verified based on any or a combination SSL/TLS certificate where the certificate chain comprises a valid root certificate, signature of the first set of data packets that are issued from a credible root certificate authority, a presence in a white list, non-presence in a negative list, web ranking, a check performed by a parser.

In an embodiment, the ICVS is associated with a parser to generate verifiable claims or credentials.

In an embodiment, the ICVS is selected from a plurality of white-listed web portals, said plurality of white-listed web portals having one or more attributes selected from any or a combination of strength of user authentication, strength of identity proofing, types of biometrics available, population coverage, legal acceptance, types of identity attributes available, category of white list, region/country to which each white-listed web portal pertains, and is associated standardized parser output.

In an embodiment, user is an entity, a virtual user, a nominated user, or a natural person.

In an embodiment, a set of verifiable credentials are generated from any or a combination of the first, second or third set of data packets, said set of verifiable credentials comprising any or a combination of source, user identity information, name, address, date of birth, city, unique identifiers, email, phone number, standardized credentials as per World Wide Web Consortium (W3C), and biometric information.

In an embodiment, the set of verifiable credentials are associated with users' private key or self-sovereign identity.

In an embodiment, the third set of data packets are associated with an identity of the user, said identity also being associated with a corresponding fourth set of data packets that are generated from a second ICVS.

In an embodiment, the association of the user identity with the fourth set of data packets happens after user authentication that is based on any or a combination of a valid password, knowledge based authentication, biometric authentication, device based authentication, one-time password (OTP) based authentication, PM based authentication, social authentication, Single-sign-on (SSO) based authentication, or behavioral authentication.

In an embodiment, the third set of data packets are encrypted with a token, said encrypted set of third data packets being stored on a remote server, wherein the token is shared with a plurality of entities and/or the user based on users' consent.

In an embodiment, the token is encrypted using public key of the user of the respective plurality of entities.

In an embodiment, the token is encrypted using public key of SSL/TLS certificate of the ICVS.

In an embodiment, the token is configured as a non-fungible token (NFT) on a blockchain or a DLT based on information from the first, second, or third set of data packets such that the information used to create the NFT remains unique across all NFTs that are valid.

In an embodiment, the NFT or the token is associated with identity of the user.

In an embodiment, a parallel second and third set of data packets are created using parsers to generate one of at least one of translation of the second and third set of data packets, or verifiable credentials, or a standardized output based on one or more attributes of the ICVS.

A yet another aspect of the present disclosure relates to a method, implemented by a processor running a trusted execution environment (TEE) comprising: retrieving a first set of data packets pertaining to a user from an independent cryptographically verifiable source (ICVS) through a secure data channel; binding a second set of data packets that are selected from the first set of data packets with origination information of the ICVS so as to generate a third set of data packets that is processed to generate a cryptographic value pertaining to said third set of data packets; and storing the cryptographic value in an immutable storage, said cryptographic value being used by a third relying-party to validate integrity of the third set of data packets.

In an embodiment, the method further comprises: configuring, for the user working on a verification initiator unit (VIU) provided by the third relying entity, a first session having a hyperlink that enables instantiation of a second session on a virtual browser on the VIU using a web gateway, said second session being partially configured on a remote terminal so as to operatively couple the remote terminal with the first session of the user of a first computing device; and configuring the second session to open, in the virtual browser, the ICVS to enable said ICVS to authenticate the user.

In an embodiment, the first set of data packets are retrieved post successful authentication of the user through any or a combination of authenticating at the ICVS, authenticating the user at the device, authenticating using a biometric means, and authenticating using a private key so that the third set of data packets is associated with the authenticated user.

FIG. 1 illustrates an exemplary network architecture 100 showing plurality of users and how the plurality of users interacts with system in accordance with an embodiment of the present disclosure.

According to a network implementation 100, a system 102 (referred to as system 102, hereinafter) can include a Decentralized Document and Entity Verification Engine (DDEVE) 110 that facilitates authentication and verification of documents associated with the entities and entities themselves. The entities are interchangeably referred to as users 108-1, 108-2 ... 108-N (collectively referred to as users 108, and individually referred to as the user 108 hereinafter), which include virtual users, nominated users, or natural persons.

Although the present subject matter is explained considering that the system 102 is implemented as an application on a server, it may be understood that the system 102 may also be implemented in a variety of computing systems, such as a laptop computer, a desktop computer, a notebook, a workstation, a server, a network server, a cloud-based environment and the like. It would be appreciated that the system 102 may be accessed by multiple users 108, through one or more computing devices 106-1, 106-2 ... 106-N (collectively referred to as computing devices 106 and individually referred to as computing device 106, hereinafter), or applications residing on the computing devices 106. Also, the computing devices 106 can be VIUs provided by the relying entities to authenticate the users 108. In an example, a verification service may be provided by an organization such as a bank during account opening of users such as new customers. For the purpose of verification, the VIUs can be configured at the bank's premises so as to be accessible to the user 108 when needed. Communication between VIU and system 102 can be via any appropriate means such as Internet and the like.

In an aspect, the system 102 can be operatively coupled to a website and so be operable from any Internet enabled computing device 106. Examples of the computing devices 106 may include, but are not limited to, a portable computer, a personal digital assistant, a handheld device, and a workstation. The computing devices 106 can be communicatively coupled with the system 102 through a network 104.

In one implementation, the network 104 can be a wireless network, a wired network or a combination thereof. The network 104 can be implemented as one of the different types of networks, such as intranet, local area network (LAN), wide area network (WAN), the internet, and the like. Further, the network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 104 can include a variety of network devices, including routers, bridges, servers, computing devices, storage devices, and the like. In another implementation the network 104 can be cellular network or mobile communication network based on various technologies, including but not limited to, Global System for Mobile (GSM), General Packet Radio Service (GPRS), Code Division Multiple Access (CDMA), Long Term Evolution (LTE), WiMAX, and the like.

In an aspect, the DDEVE 110 can be configured in a device such that a TEE is configured on the device or is configured virtually from the device and is operatively coupled with the device. The TEE can include a secure web browser that is configured with remote terminal such as a remote secure virtual terminal uses a protocol selected from any or a combination of RDP and VNC. The DDEVE 110 can retrieve a first set of data packets pertaining to a user 108 from an ICVS through a secure data channel such that the first set of data packets can be retrieved in the form of any or a combination of a web page, text, picture, context, HTML, CSS, DHTML, MHTML, PDF, downloaded file and the like that opens in the secure web browser. The ICVS can be associated with a parser to generate verifiable claims or credentials and selected from a plurality of white-listed web portals, the plurality of white-listed web portals having one or more attributes selected from any or a combination of strength of user authentication, strength of identity proofing, types of biometrics available, population coverage, legal acceptance, types of identity attributes available, category of white list, region/country to which each white-listed web portal pertains, and associated standardized parser output. The first set of data packets can also include biometric information such as photograph of the user 108, fingerprint of the user 108, voice of the user 108, iris details of the user 108, and the like that can be used to authenticate the user 108. In an embodiment, the ICVS include a secure website, an NFC card, a regulatory entity issued document, a source having a certificate issued by a certified authority and the like that can be verified based on SSL/TLS certificate where the certificate chain comprises a valid root certificate, signature of the first set of data packets that are issued from a credible root certificate authority, a presence in a white list, non-presence in a negative list, web ranking, a check performed by a parser and the like.

In an aspect, the DDEVE 110 can bind a second set of data packets that are selected from the first set of data packets with origination information of the ICVS using a cryptographically signed executable code so as to generate a third set of data packets that is processed to generate a cryptographic value associated with cryptographic signature of the user 108. The origination information of the ICVS can be selected from any or a combination of SSL, TLS, NFC information, IP address, domain name, who is information, certificate owner information, IP routes, forensic data pertaining to the ICVS, timestamp, sensor data pertaining to the ICVS, location information of the ICVS, and at least a portion of certificate information of the ICVS. The origination information of the ICVS can also include any or a combination of cryptographic proof of at least one of operating software and the TEE that is used to generate the third set of data packets, cryptographic proof of the user, cryptographic proof of entity running the TEE, cryptographic proof of verifier, and cryptographic proof of the third relying-party. The binding between the second set of data packets with the origination information of the ICVS can be performed using any or a combination of checksum, hash, and the like.

Further, the DDEVE 110 can store the cryptographic value in an immutable storage such as a blockchain, a DLT, a merkle tree, a database and the like, so that the cryptographic value can be used by a relying-party 112 to validate integrity of the third set of data packets that can be associated with an identity of the user 108. The identity can include PKIs associated with the user 108, password of the user 108, PIN of the user 108, biometrics of the user 108, behavioral data of the user 108, non-fungible tokens of the user 108, FIDO credentials of the user 108, device attributes of the user 108, demographics of the user 108, and the like. The third set of data packets also include or can be associated with results of matching biometric information with the user 108, or results of matching authentication information with the user 108, or results of matching identity information with the user 108. Those skilled in the art would appreciate that in order to enhance security the cryptographic value can be digitally signed based on any or a combination of HSM and TPM and can be associated with a timestamp that is based on retrieval of the first set of data packets from the ICVS.

In an embodiment, when the ICVS is the NFC card, the DDEVE 110 can retrieve the first set of data packets from receiver of the NFC card and can decrypt the retrieved first set of data packets to enable selection of the second set of data packets and subsequent binding of the selected second set of data packets with the origination information.

In an embodiment, wherein the DDEVE 110 can be configured to match data packets from any or a combination of the first, second, or third set of data packets with identity data pertaining to the user that is sourced from the device.

In an embodiment, a set of verifiable credentials associated with users' private key or self-sovereign identity can be generated from any or a combination of the first, second or third set of data packets, where the set of verifiable credentials can include any or a combination of user identity information, name, address, date of birth, city, unique identifiers, email, phone number, standardized credentials as per W3C, biometric information, and the like.

In an embodiment, the third set of data packets can be associated with an identity of the user 108, the identity also being associated with a corresponding fourth set of data packets that are generated from a second ICVS. The association of the user identity with the fourth set of data packets can happen after user authentication that is based on any or a combination of a valid password, knowledge based authentication, biometric authentication, device based authentication, OTP based authentication, PKI based authentication, social authentication, SSO based authentication, or behavioral authentication.

In an embodiment, the third set of data packets can be encrypted with a token so that the encrypted set of third data packets can be stored on a remote server and the token can be shared with a plurality of entities and/or the user 108 based on users' consent. The token can further be encrypted using public key of the user 108 of the respective plurality of entities or public key of SSL/TLS certificate of the ICVS. The token can be configured as an NFT on a blockchain or a DLT based on information from the first, second, or third set of data packets such that the information used to create the NFT remains unique and the NFT or the token is associated with identity of the user 108.

In an embodiment, a parallel second and third set of data packets can be created using parsers to generate one of at least one of translation of the second and third set of data packets, or verifiable credentials, or a standardized output based on attributes of ICVS.

According to another aspect, the DDEVE 110 can configure a first session having a hyperlink for a user 108 working on a VIU provided by a relying entity 112 so that first session can enable instantiation of a second session on a virtual browser on the VIU using a web gateway, where the virtual browser can comprises a plug-in that receives at least session parameter related to any or a combination of user, ICVS, timestamp, location, IP address, and the like that is associated with the first session. The second session can be partially configured on a remote terminal running on a TEE, so as to operatively couple the remote terminal with the first session of the user 108 of the first computing device 106. Further, the DDEVE 110 can configure the second session to open an ICVS in the virtual browser to enable the ICVS to authenticate the user 108.

In an embodiment, to authenticate the user 108, the DDEVE 110 can retrieve a first set of data packets pertaining to the user 108 from the ICVS through a secure data channel. Those skilled in the art would appreciate that the virtual browser is a secure browser that does not allow tampering of the first set of data packets beyond what is allowed by the ICVS. Further, the first set of data packets can be processed and utilized by the first session so as to match the first set of data packets containing user information with user information available in the first session. Also, alternately, the first set of data packets can be retrieved post successful authentication of the user through any or a combination of authenticating at the ICVS, authenticating the user at the device, authenticating using a biometric means, and authenticating using a private key.

In an embodiment, the DDEVE 110 can bind a second set of data packets that are selected from the first set of data packets with origination information of the ICVS so as to generate a third set of data packets associated with authentication data pertaining to the user and one or more attributes of the TEE. Further, the third set of data packets can be accessed by the relying entity of the first session or one or more relying entities in the form of any or a combination of verifiable claims or credentials, a PDF file, a decision, a JSON, an XML, an electronic record, and a key.

Figure 2:
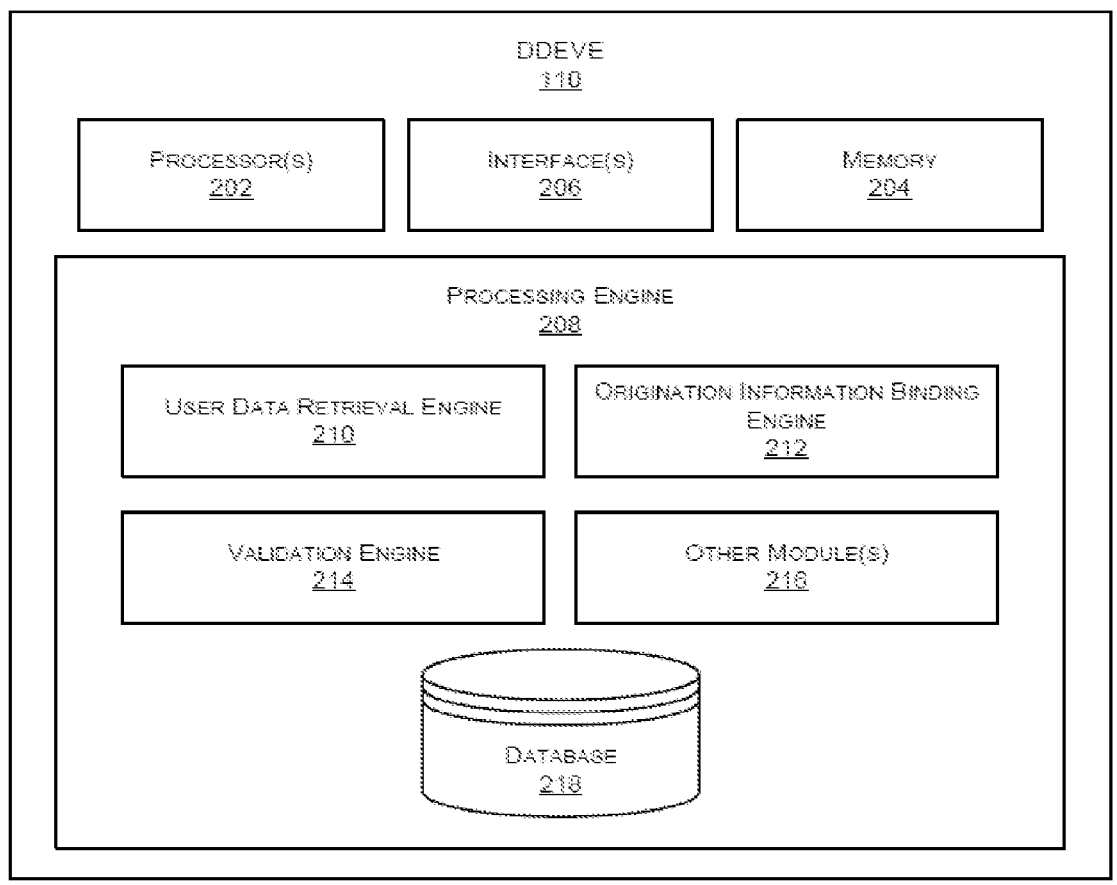
FIG. 2 illustrates exemplary functional components of a Decentralized Document and Entity Verification Engine (DDEVE) in accordance with an embodiment of the present invention.

FIG. 2 illustrates exemplary functional components of the DDEVE 110 in accordance with an embodiment of the present invention.

As illustrated, DDEVE 110 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of DDEVE 110. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

DDEVE 110 can also include one or more interface(s) 206. Interface(s) 206 may include a variety of interfaces, for example, interfaces for data input and output devices, referred to as I/O devices, storage devices, and the like. Interface(s) 206 may facilitate communication of DDEVE 110 with various devices coupled to DDEVE 110. Interface(s) 206 may also provide a communication pathway for one or more components of DDEVE 110. Examples of such components include, but are not limited to, processing engine(s) 208 and data 218.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, DDEVE 110 can include the machine-readable storage medium storing the instructions and the processing resource to execute the instructions, or the machine-readable storage medium may be separate but accessible to DDEVE 110 and the processing resource. In other examples, processing engine(s) 208 may be implemented by electronic circuitry. Data 218 can include data that is either stored or generated as a result of functionalities implemented by any of the components of processing engine(s) 208.

In an example, processing engine(s) 208 can include a user data retrieval engine 210, an origination information binding engine 212, a validation engine 214, and other engine(s) 216. Other engine(s) 216 can implement functionalities that supplement applications or functions performed by DDEVE 110 or processing engine(s) 208.

In an embodiment the user data retrieval engine 210 can retrieve a first set of data packets pertaining to a user from an ICVS through a secure data channel. The ICVS can be selected from a plurality of white-listed web portals having one or more attributes including strength of user authentication, strength of identity proofing, types of biometrics available, population coverage, legal acceptance, types of identity attributes available, category of white list, region/country to which each white-listed web portal pertains, and associated standardized parser output. The ICVS can include a secure website, an NFC card, a regulatory entity issued document, a source having a certificate issued by a certified authority and the like. For instance, ICVS can include official websites of Aadhaar (UIDAI), passport office, election commission, banks, income tax office, etc, which can be associated with a parser to generate verifiable claims or credentials such as user name, date of birth, etc. Those skilled in the art would appreciate that the ICVS can be verified based on any or a combination SSL/TLS certificate where the certificate chain can include a valid root certificate, signature of the first set of data packets that are issued from a credible root certificate authority, a presence in a white list, non-presence in a negative list, web ranking, a check performed by a parser and the like. For example, whether a website of a XYZ Bank is a valid ICVS or not can be determined based on factors such as certifying authority of XYZ Bank, a presence of the website in a white list, non-presence of the website in a negative list, web ranking of the website, and the like. Such verification enables the DDEVE 110 to obtain the first set of data packets from an authenticated source.

Those skilled in the art would appreciate that identity data of different users can be already available at one or more secure repository associated with the various ICVSs. For instance, an Indian user can access Aadhaar data by logging into UIDAI website and providing his/her username and password. Number of such repositories as well as records/data therein can keep on growing as more and more categories of data and more and more users of each are added to such repositories. For instance, other ICVS or data repositories can have information regarding birth certificates, qualifications, driving incenses etc. and can be made available by various governmental bodies, educational institutions and even private institutions as the proposed system gains acceptance.

In an embodiment, the user data retrieval engine 210 can also retrieve biometric information such as photograph of the user, fingerprint of the user, voice of the user, iris details of the user, and the like as a part of the first set of data packets that can be used to authenticate the user. Those skilled in the art would appreciate that the first set of data packets can be retrieved from the ICVS in the form of any or a combination of a web page, text, picture, context, HTML, CSS, DHTML, MHTML, PDF, downloaded file, and the like that opens in the secure web browser.

In an embodiment, when the ICVS is the NFC card such as electronic passports or other national identity cards, the user data retrieval engine 210 can retrieve the first set of data packets from receiver of the NFC card and can decrypt the retrieved first set of data packets.

In an embodiment, a first session running on a VIU provided by a relying entity can provide a hyperlink so that first session can enable instantiation of a second session on a virtual browser on the VIU using a web gateway. The virtual browser can comprise a plug-in that receives at least session parameter related to any or a combination of user, ICVS, timestamp, location, IP address, and the like that is associated with the first session. The second session, which can be partially configured on a remote terminal running on a TEE, operatively couples the remote terminal with the first session running on the VIU. Thus, the second session can be instantiated from the ongoing first session at the VIU such that the second session opens an ICVS in the virtual browser to enable the ICVS to authenticate the user. The user data retrieval engine 210 can then retrieve the first set of data packets pertaining to the user from the ICVS through a secure data channel.

In an example, when a user attempts to authenticate itself at the VIU, say on a web interface presented on the display device of the VIU, the first session can provide a link/button on the interface such that the second session can be instantiated in a virtual browser that can share the first set of data packets of the session information that forms part of the VIU. Those skilled in the art would appreciate that the virtual browser is a secure browser that does not allow tampering of the first set of data packets beyond what is allowed by the ICVS. Further, the first set of data packets can be processed and utilized by the first session so as to match the first set of data packets containing user information with user information available in the first session. For example, the user data provided by the user can be matched with the first set of data retrieved by the ICVS. Also, alternately, the first set of data packets can be retrieved post successful authentication of the user through any or a combination of authenticating at the ICVS, authenticating the user at the device, authenticating using a biometric means, and authenticating using a private key. For example, the first set of data packets can be retrieved when log-in details provided by user are correct, thereby serving to authenticate the user to an institution (for instance, a bank where the user has gone to open a savings account) that requires authenticated user data.

In an embodiment, the origination information binding engine 212 can bind a second set of data packets that are selected from the first set of data packets with origination information of the ICVS using a cryptographically signed executable code so as to generate a third set of data packets that is processed to generate a cryptographic value associated with cryptographic signature of the user. The origination information of the ICVS can be selected from any or a combination of SSL, TLS, NFC information, IP address, domain name, who is information, certificate owner information, IP routes, forensic data pertaining to the ICVS, timestamp, sensor data pertaining to the ICVS, location information of the ICVS, and at least a portion of certificate information of the ICVS. The origination information of the ICVS can also include any or a combination of cryptographic proof of at least one of operating software and the TEE that is used to generate the third set of data packets, cryptographic proof of the user, cryptographic proof of entity running the TEE, cryptographic proof of verifier, and cryptographic proof of the third relying-party. For instance, the origination information binding engine 212 can append a cryptographic signature to the second set of data packets so that any suitably configured relying entity receiving the third set of data packet can validate that the third set of data packets was indeed generated by the TEE.

In an example, a user can click a link/button on a user interface displaying first session on the VIU, such link shown as authenticate button. Upon clicking authenticate button, the second session can be instantiated in a secure virtual browser on the VIU that can display a log-in interface of the ICVS so that the user can authenticate himself with, or receive authentic document/data from the ICVS. As can be appreciated, a plurality of links each pertaining to a different ICVS can easily be provided on the VIU. The user can login through the second session running on the virtual browser instantiated on VIU to ICVS and request all i.e. first set of data or a subset i.e. second set of data retrieved from the ICVS. For instance, the user may require only his photograph and signature retrieved from the ICV for the purpose of authentication by a relying entity. The origination information binding engine 212 can bind the second set of data with the origination information using a checksum, a hash function, a cryptographic function and the like to generate third set of data.

In another embodiment, the origination information can include a hash key that can be used to signal an alert if the first or second set of information is tampered in any manner. The origination information can also include metadata of an HTML page accessed by the user (that may include author, date created, date modified, file size, keywords etc.), time of retrieval, date of capture, IP address of the user/requester, at least a part of SSL certificate of the virtual browser/secure repository 108 etc. A digital signature may be provided to the HTML page. This digital signature can include (or be associated with) all or part of data as elaborated above, including the at least part of SSL certificate/digital certificates already associated with the HTML page. The page along with the digital signature may be further hashed and stored on a blockchain. The hash may be in the form of a checksum for instance.

In an embodiment, the validation engine 214 can store the cryptographic value in an immutable storage such as a blockchain, a DLT, a merkle tree, a database and the like, so that the cryptographic value can be used by a relying-party to validate integrity of the third set of data packets that can be associated with an identity of the user. Alternately, the third set of data packets can be accessed by the relying entity of the first session or one or more relying entities in the form of any or a combination of verifiable claims or credentials, a PDF file, a decision, a JSON, an XML, an electronic record, and a key for validation.

In an implementation, the third set data packets can be provided as a standardized output (e.g. in PDF document) that is transmitted to the VIU or the computing device that can be downloaded by user. The standardized document can contain the origination information; however, the origination information may or may not be visible. The standardized document can include, for instance, a hidden watermark making the document so that the document cannot be copied. The standardized output along with associated cryptographic signature may similarly be stored on a blockchain, thereby the preventing tampering of the data contained therein.

As described above, the third set of data packets can be stored in an immutable manner on a blockchain. Such storage can include or be in form of non-fungible tokens (NFTs). An NFT is a token that is uniquely identifiable and distinguishable during interaction and circulation. NFTs are well suited to handle the data packets associated with unique information, for instance, unique Aadhaar card number to each individual. NFTs can be associated with personal identity information such as birth certificates, passports, driving licenses etc. Access controls can be added to NFTs. For instance, an educational institute can store university diploma of an individual on blockchain using NFT and can provide access to that NFT to the individual. An organization can implement provide a VIU at its office so that a user i.e. a candidate being interviewed by the organization on reaching the office, can use VIU to access his NFT and associated university diploma in a secure and untamperable manner After due authentication, the university diploma data can be provided to the organization for further use. In another exemplary embodiment, an NFT associated with the third set of data packets stored on a blockchain can ensure that the data packets are retrieved only a limited number of times before being destroyed.

Those skilled in the art would appreciate that identity can include PKIs associated with the user, password of the user, PIN of the user, biometrics of the user, behavioral data of the user, non-fungible tokens of the user, FIDO credentials of the user, device attributes of the user, demographics of the user, and the like. The third set of data packets also include or can be associated with results of matching biometric information with the user, or results of matching authentication information with the user, or results of matching identity information with the user. Those skilled in the art would appreciate that in order to enhance security the cryptographic value can be digitally signed based on any or a combination of HSM and TPM and can be associated with a timestamp that is based on retrieval of the first set of data packets from the ICVS.

In an embodiment, the validation engine 214 can match data packets from any or a combination of the first, second, or third set of data packets with identity data pertaining to the user that is sourced from the device. Further, a set of verifiable credentials associated with users' private key or self-sovereign identity can be generated from any or a combination of the first, second or third set of data packets, where the set of verifiable credentials can include any or a combination of user identity information, name, address, date of birth, city, unique identifiers, email, phone number, standardized credentials as per W3C, biometric information, and the like.

In an embodiment, the third set of data packets can be associated with an identity of the user, the identity also being associated with a corresponding fourth set of data packets that are generated from a second ICVS. For example, the third set of data packets can be generated using data from Aadhaar and the fourth set of data can be generated from the data obtained from electronic passport so that the validation engine 214 enable validation based on matching of the third set of data and the fourth set of data. The association of the user identity with the fourth set of data packets can happen after user authentication that is based on any or a combination of a valid password, knowledge based authentication, biometric authentication, device based authentication, OTP based authentication, PKI based authentication, social authentication, SSO based authentication, or behavioral authentication.

In an embodiment, the validation engine 214 can encrypt the third set of data packets with a token so that the encrypted set of third data packets can be stored on a remote server and the token can be shared with a plurality of entities and/or the user based on users' consent. The token can further be encrypted using public key of the user of the respective plurality of entities or public key of SSL/TLS certificate of the ICVS. The token can be configured as a NFT on a blockchain or a DLT based on information from the first, second, or third set of data packets such that the information used to create the NFT remains unique across all NFTs that are valid and the NFT or the token is associated with identity of the user.

In an implementation, the third set of data packets need not necessarily be delivered back to the computing device or the VIU and can be directly delivered to a relying entity (for instance, an authentication computer of a banking system) that can confirm that the information contained in the third set of data packets has not been tampered with. The information contained in the third set of data packets within to generate a suitable signal (for instance, an alert or a permission command), for a downstream device (for instance, a cash dispensing device at an Automated Teller Machine).

In an embodiment, on generation of the third set of data packets, the validation engine 214 can create a parallel second and third set of data packets using parsers to generate at least one translation of the second and third set of data packets, or verifiable credentials, or a standardized output based on one or more attributes of ICVS. For instance, when a standardized output is generated, the validation engine 214 can create translation (in any language) of the standardized output that can be used by the relying entities as containing authentic information of the user.

Figure 3A:
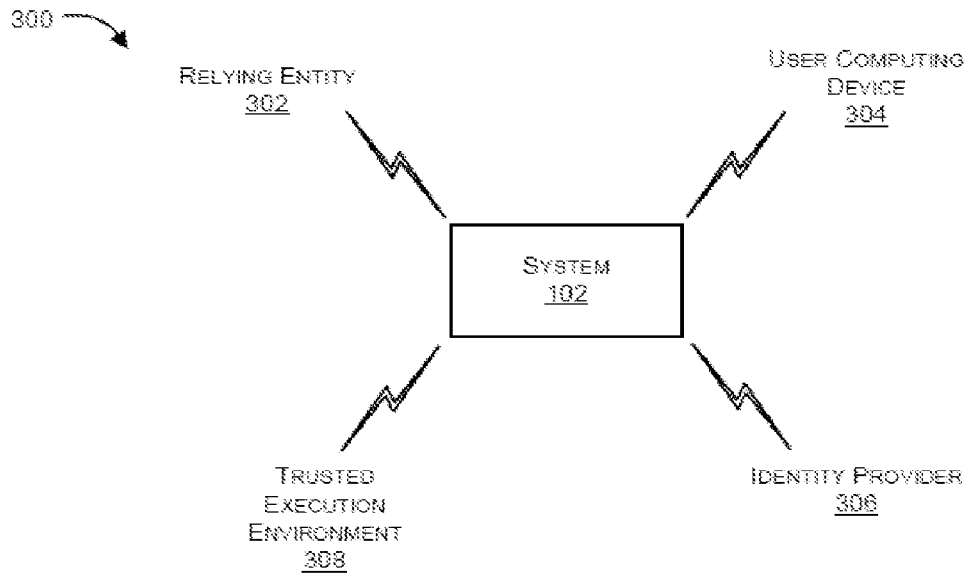
FIGS. 3A-B illustrate exemplary implementations of the system in accordance with an embodiment of the present invention.
Figure 3B:
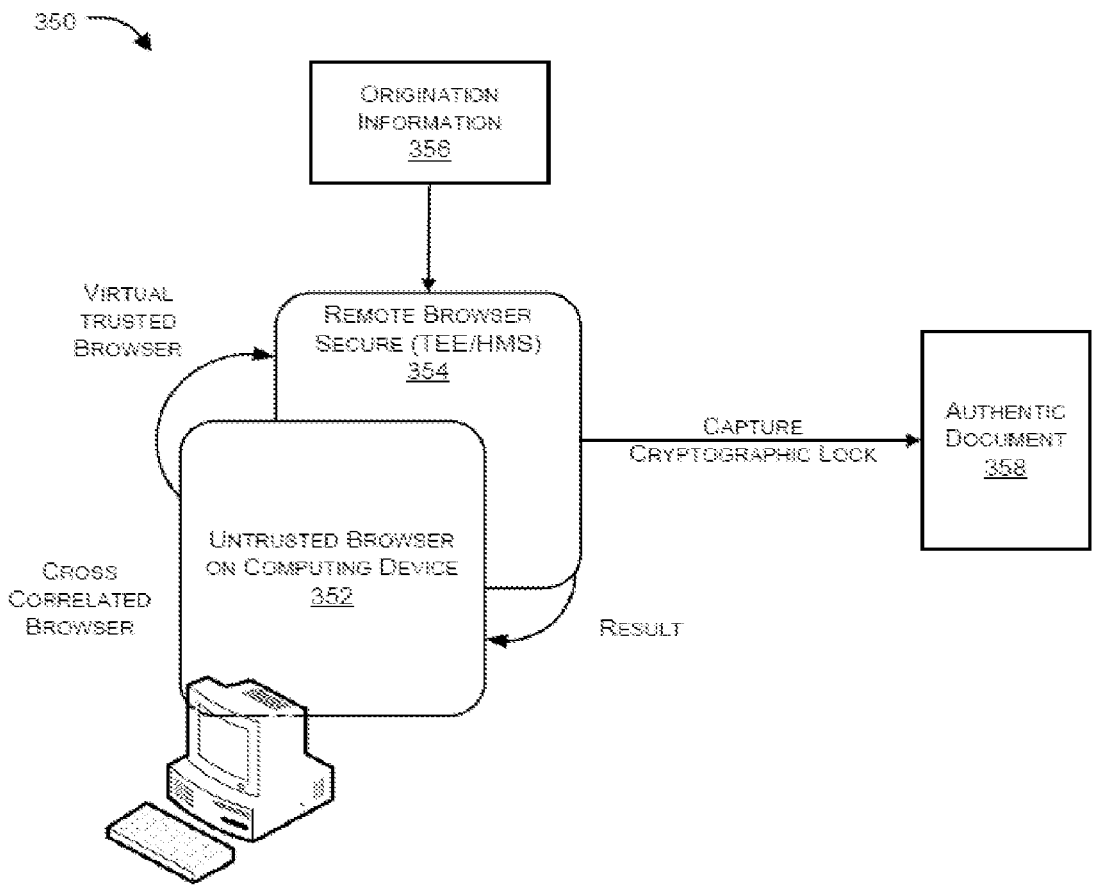

FIGS. 3A-B illustrate exemplary implementations (300 and 350) of the system in accordance with an embodiment of the present invention.

According to an implementation as illustrated in FIG. 3A, the system 102 links relying entity 302, user computing device 304, identity provider 306 and TEE 308. In context of an example, the user through user computing device 304 (which may include a VIU) can provide user credentials to access secure data (first set of data) from an ICVS. A second set of data can be selected from the first set of data so that the system 102 can bind the second set of data with origination information (SSL/TSL certificate, cryptographic signature, demographic signature, etc.) provided by the identity provider 306 to generate third set of data packets. The TEE 308 can capture the third set of data packets and can enable storage of the third set of data packets or a cryptographic value pertaining to the third set of data packets in an immutable storage such as a block chain. Alternately, the TEE 208 can enable transmission of the third set of data packets to the relying entity 302, which may accept the third set of data packets as integral and authentic data provided by the user.

According to an implementation as illustrated in FIG. 3B, a user can use a first session (which may be an untrusted session 352 running on the computing device) having a hyperlink, for instantiation of a second session in a virtual browser on the computing device. The second session can open an ICVS through a remote secure browser so that user data (first set of data packets) can be retrieved from the ICVS through a secure data channel and the user data can be bound with origination information 356 of the ICVS to generate a third set of data packets. The third set of data packets can be generated as a standardized output e.g. authentic document 358 and can be accessed by a relying entity.

Figure 4A:
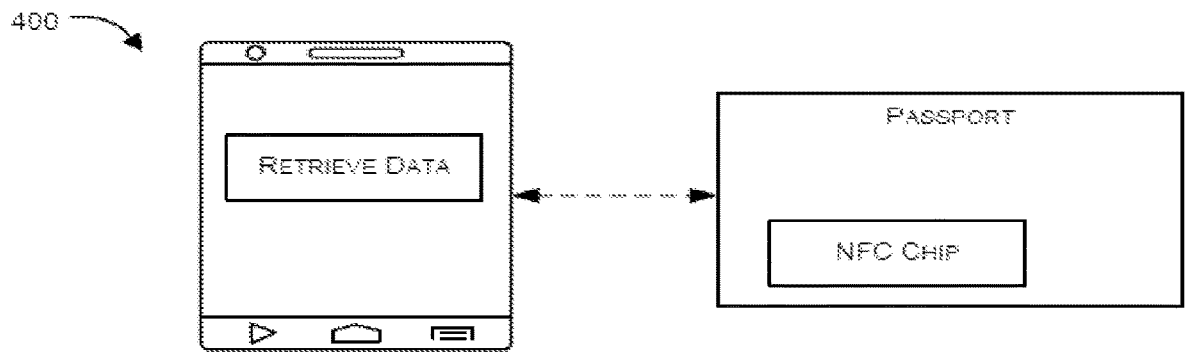
FIGS. 4A-C illustrate an example of generation of an authentic document in accordance with an embodiment of the present invention.
Figure 4B:
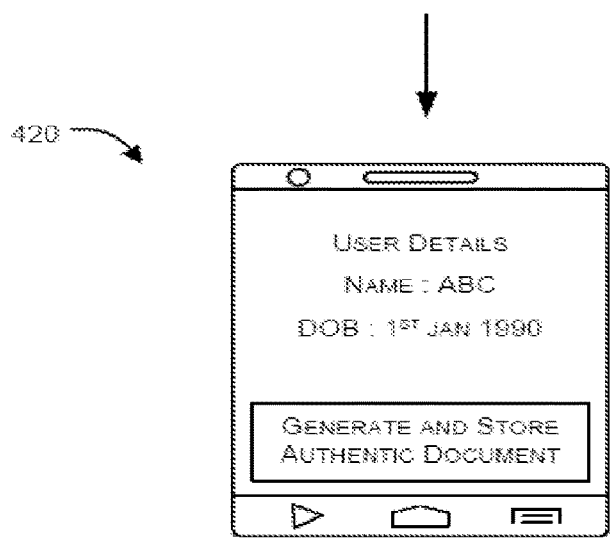
Figure 4C:
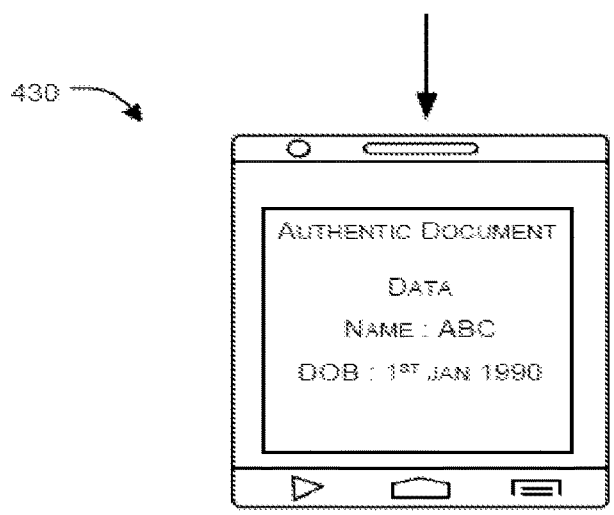

FIGS. 4A-C illustrate an example of generation of an authentic document in accordance with an embodiment of the present invention.

According to an example, as illustrated in representation 400, computing device of a user through receiver of NFC card can retrieve user data (first set of data packets) from NFC chip of passport of the user by using 'retrieve data' button. The retrieved first set of data packets can be decrypted to enable selection of the second set of data packets and subsequent binding of the selected second set of data packets with the origination information.

Further, as illustrated in representation 420, the user can generate authentic document (representing third set of data packets) by pressing 'generate and store authentic document' button. The authentic document can be generated by binding the second set of data packets with origination information. Further, a cryptographic value pertaining to third set of data packets can be generated.

As illustrated in representation 430, the authentic document (or cryptographic value) can be displayed on the computing device and can be stored in an immutable storage so that the authentic document can be used by a relying entity to validate integrity of the third set of data packets.

FIGS. 5A-C illustrate another example of generation of an authentic document in accordance with an embodiment of the present invention.

According to an example, as illustrated in representation 500, a user working on a VIU provided by a relying entity or a user computing device can be displayed with a first session having a hyperlink e.g. 'authenticate' button that enables instantiation of a second session in virtual browser. In an example, the first session can enable the user to provide user name and password so that the user can be directed to the second session.

As illustrated in representation 520, the second session can open, an ICVS e.g. UIDAI website containing Aadhaar data to enable the ICVS to authenticate the user by retrieving a first set of data packets (e g name and date of birth) pertaining to the user through a secure data channel. The user can use 'generate authentic document' button to proceed further.

On pressing the generate authentic document button the all or part of user data (second set of data packets) can be bound with origination information of the ICVS so as to generate a third set of data packets can be a standard document as illustrated in representation 530, which can be displayed to the user and can be accessed by a relying entity. The relying entity can use the authentic document for further use.

Figure 6A:
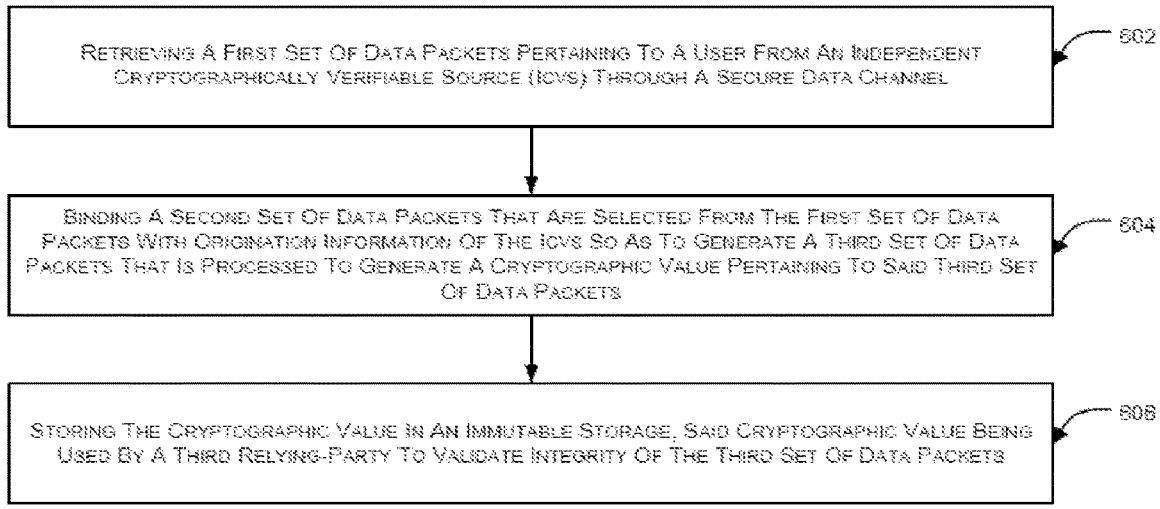
FIGS. 6A-B are flow diagrams illustrating exemplary methods in accordance with an embodiment of the present disclosure.
Figure 6B:
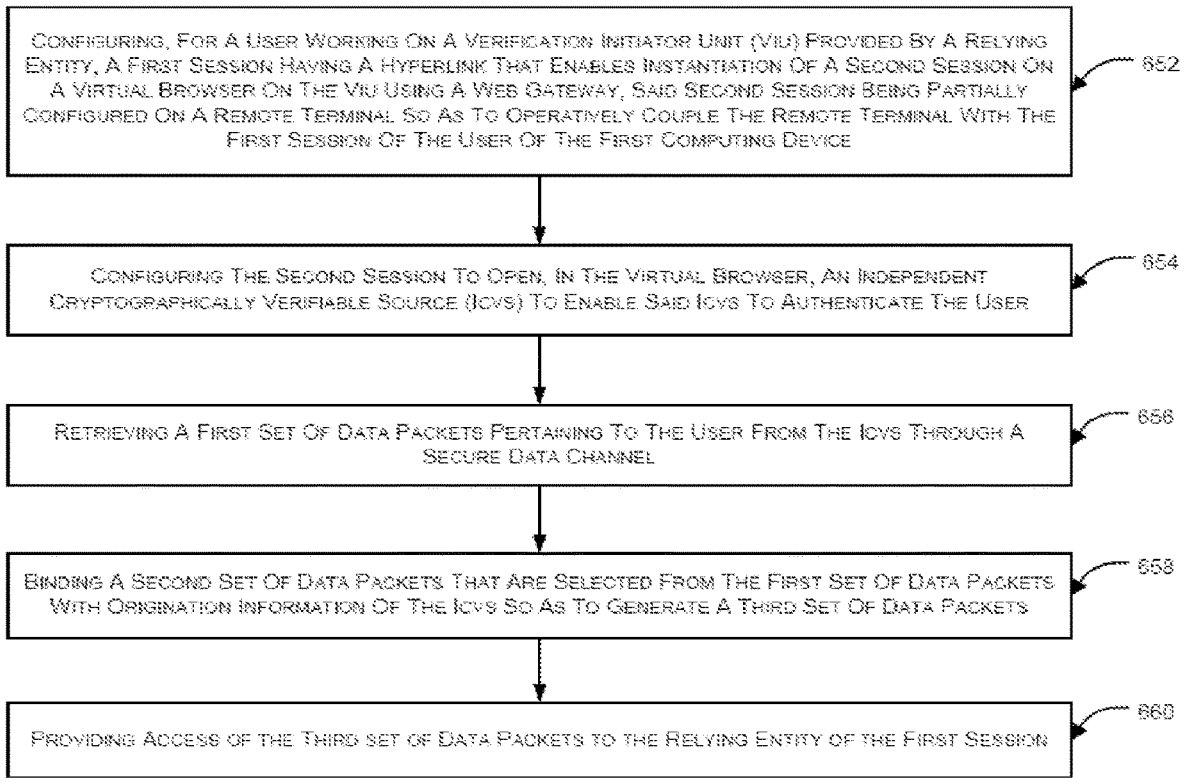

FIGS. 6A-B are flow diagrams illustrating exemplary methods in accordance with an embodiment of the present disclosure.

Referring to an example as illustrated in FIG. 6A, at block 602, a first set of data packets pertaining to a user can be retrieved from an ICVS through a secure data channel. Further, at block 604, a second set of data packets that are selected from the first set of data packets can be bound with origination information of the ICVS so as to generate a third set of data packets that is processed to generate a cryptographic value pertaining to the third set of data packets. At block 606, the cryptographic value can be stored in an immutable storage, the cryptographic value being used by a third relying-party to validate integrity of the third set of data packets.

Referring to an example as illustrated in FIG. 6B, at block 652, a first session can be configured for a user working on a VIU provided by a relying entity. The first session can have a hyperlink that enables instantiation of a second session on a virtual browser on the VIU using a web gateway. The second session can be partially configured on a remote terminal so as to operatively couple the remote terminal with the first session of the user of the first computing device.

At block 654, the second session can be configured to open, in the virtual browser, an ICVS to enable the ICVS to authenticate the user. At block 656 the first set of data packets pertaining to the user can be retrieved from the ICVS through a secure data channel. At block 658, a second set of data packets that are selected from the first set of data packets can be bound with origination information of the ICVS so as to generate a third set of data packets and at block 660, the relying entity of the first session can be provided access of the third set of data packets.

Those skilled in the art would appreciate that the techniques disclosed herein for example, binding of the user data retrieved from the ICVS with origination information of the ICVS and storing the associated cryptographic value in an immutable storage that can be used by a relying-party to validate integrity of the data advantageously maximizes authenticity of information of the user, cryptographically secures the user information, and provides fraud proof approach of identity sharing while saving privacy of sensitive information pertaining to the user.

Figure 7:
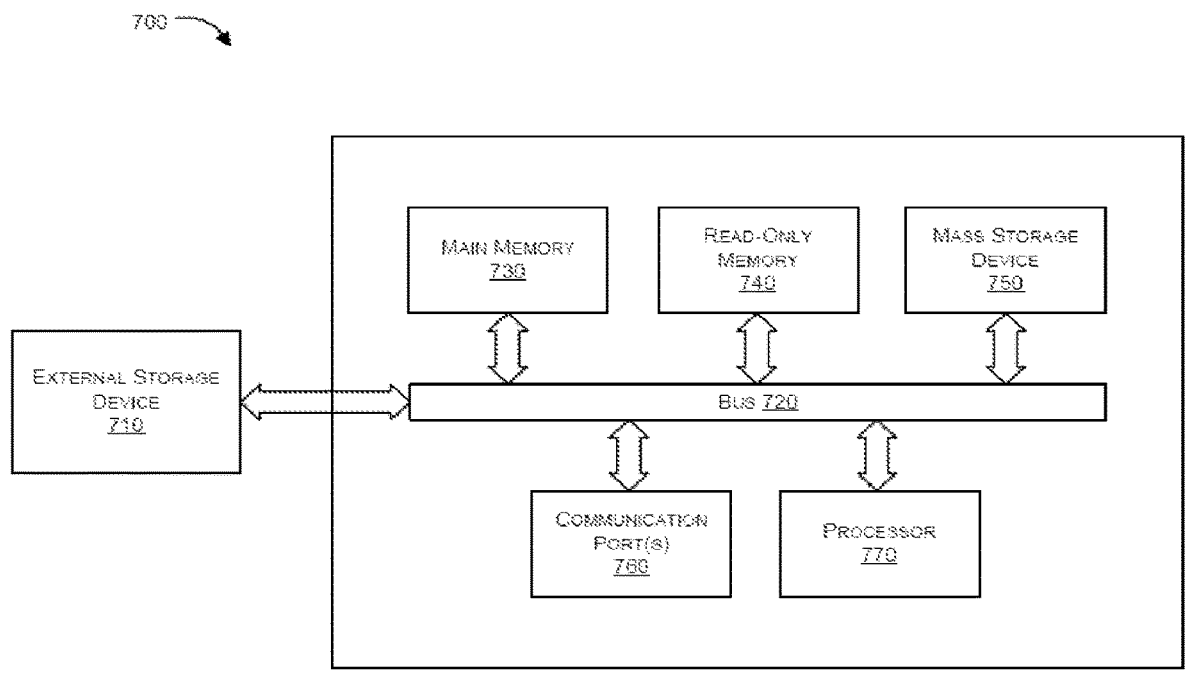
FIG. 7 illustrates an exemplary computer system in which or with which embodiments of the present invention may be utilized.

FIG. 7 illustrates an exemplary computer system 700 in which or with which embodiments of the present invention may be utilized.

As shown in FIG. 7, computer system includes an external storage device 710, a bus 720, a main memory 730, a read only memory 740, a mass storage device 750, a communication port 760, and a processor 770. Computer system may represent some portion of relying entity 112, computing device 106 or system 102.

Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides a system and method for generating verified documents for an entity.

The present disclosure provides a system and method for generating verified documents that cannot be tampered.

The present disclosure provides a system and method for generating verified documents that can be used by relying entities or authorities as a proof of authentic information of a user.

The present disclosure provides a system and method for generating verified documents that can be associated with a unique identifier/code so that the user or the relying entity can use the unique identifier/code to fetch verified information of the user for various purposes.

The present disclosure provides a system and method for generating verified documents that allows access of private data of the user without loss of trust.

The present disclosure provides a system and method for generating verified documents that provides anti-impersonation checks against global third parties.

The present disclosure provides a system and method for generating verified documents that solves typical "phone-home-problem" by decentralizing the verification proof using blockchain.

The present disclosure provides a system and method for generating verified documents that enables relying parties to access private information stored with third parties, while maximizing its authenticity, privacy and decentralized verification.

The invention claimed is:

1. A system comprising:
a processor; and
a non-transitory memory comprising one or more routines, which when executed by the processor, cause the processor to:
configure, for a user working on a verification initiator unit (VIU) provided by a relying entity, a first session having a hyperlink that enables instantiation of a second session on a virtual browser on the VIU using a web gateway, said second session being partially configured on a remote terminal so as to operatively couple the remote terminal with the first session of the user of a first computing device;
configure the second session to open, in the virtual browser, an independent cryptographically verifiable source (ICVS) to enable said ICVS to authenticate the user;
retrieve a first set of data packets pertaining to the user from the ICVS through a secure data channel, the virtual browser being a secure browser that does not allow tampering of the first set of data packets beyond what is allowed by the ICVS;
bind a second set of data packets that are selected from the first set of data packets with origination information of the ICVS so as to generate a third set of data packets; and
provide access of the third set of data packets to the relying entity of the first session.

2. The system of claim 1, wherein the remote terminal runs on a trusted execution environment (TEE), wherein one or more attributes of the TEE are associated with the third set of data packets.

3. The system of claim 1, wherein the virtual browser comprises a plug-in that receives at least session parameter that is associated with the first session, wherein said parameter relates to any or a combination of session id, user device, user, ICVS, timestamp, location, and IP address.

4. The system of claim 1, wherein the first set of data packets are processed and utilized by the first session so as to match the first set of data packets containing user information with user information available in the first session.

5. A device comprising:
a processor running a trusted execution environment (TEE); and
a non-transitory memory comprising one or more routines, which when executed by the processor, cause the processor to:
retrieve a first set of data packets pertaining to a user from an independent cryptographically verifiable source (ICVS) through a secure data channel;
bind a second set of data packets that are selected from the first set of data packets with origination information of the ICVS so as to generate a third set of data packets that is processed to generate a cryptographic value pertaining to said third set of data packets, the third set of data packets being encrypted with a token, said encrypted set of third data packets being stored on a remote server, wherein the token is shared with a plurality of entities and/or the user based on users' consent; and store the cryptographic value in an immutable storage, said cryptographic value being used by a third relying-party to validate integrity of the third set of data packets.

6. The device of claim 5, wherein the ICVS is any or a combination of a secure website, a Near-Field-Communication (NFC) card, a regulatory entity issued document, and a source having a certificate issued by a certified authority.

7. The device of claim 6, wherein when the ICVS is the NFC card, the processor:
retrieves, on the device, from receiver of the NFC card, the first set of data packets; and
decrypts, on the device, the retrieved first set of data packets to enable selection of the second set of data packets and subsequent binding of the selected second set of data packets with the origination information.

8. The device of claim 5, wherein the processor is further configured to match, at the device, data packets from any or a combination of the first, second, or third set of data packets with identity data sourced from the device, said identity data pertaining to the user.

9. The device claim 5, the first set of data packets are retrieved post successful authentication of the user through any or a combination of authenticating at the ICVS, authenticating the user at the device, authenticating using a biometric means, and authenticating using a private key.

10. The device of claim 5, wherein the third relying-party, upon receipt of a document whose authenticity is to be verified, generates a second cryptographic value, and matches said second cryptographic value against at least one cryptographic value that is stored in the immutable storage in order to validate the authenticity of the document.

11. The device of claim 5, wherein the first set of data packets comprises biometric information that is selected from any or a combination of photograph of the user, fingerprint of the user, voice of the user, and iris details of the user, said biometric information being used to authenticate the user.

12. The device of claim 5, wherein the third set of data packets comprise or are associated with results of matching biometric information with the user, or results of matching authentication information with the user, or results of matching identity information with the user.

13. The device of claim 5, wherein the ICVS is verified based on any or a combination SSL/TLS certificate where the certificate chain comprises a valid root certificate, signature of the first set of data packets that are issued from a credible root certificate authority, a presence in a whitelist, non-presence in a negative list, web ranking, or a check performed by a parser.

14. The device of claim 5, wherein the third set of data packets are associated with an identity of the user, said identity also being associated with a corresponding fourth set of data packets that are generated from a second ICVS.

15. The device of claim 5, wherein a parallel second and third set of data packets are created using parsers to generate one of at least one of translation of the second and third set of data packets, or verifiable credentials, or a standardized output based on one or more attributes of the ICVS.

16. A method, implemented by a processor running a trusted execution environment (TEE) comprising:
retrieving a first set of data packets pertaining to a user from an independent cryptographically verifiable source (ICVS) through a secure data channel;
binding a second set of data packets that are selected from the first set of data packets with origination information of the ICVS so as to generate a third set of data packets that is processed to generate a cryptographic value pertaining to said third set of data packets;
storing the cryptographic value in an immutable storage, said cryptographic value being used by a third relying-party to validate integrity of the third set of data packets;
configuring, for the user working on a verification initiator unit (VIU) provided by the third relying-party, a first session having a hyperlink that enables instantiation of a second session on a virtual browser on the VIU using a web gateway, said second session being partially configured on a remote terminal so as to operatively couple the remote terminal with the first session of the user of a first computing device; and
configuring the second session to open, in the virtual browser, the ICVS to enable said ICVS to authenticate the user.

17. The method of claim 16, wherein the first set of data packets are retrieved post successful authentication of the user through any or a combination of authenticating at the ICVS, authenticating the user at the device, authenticating using a biometric means, and authenticating using a private key so that the third set of data packets is associated with the authenticated user.

* * * * *